(12) United States Patent
Hagstrom et al.

(10) Patent No.: US 6,354,502 B1
(45) Date of Patent: Mar. 12, 2002

(54) CONTINUOUS COLOR TONE INFRARED DETECTED BARCODES

(75) Inventors: Erick Hagstrom, Hamel; Brent L. Nordus, Delano; Michael R. Tolrud, Chaska; Robert T. Cummins, Deephaven; Kevin R Lilland, Prior Lake; Matthew K. Dunham, Eagan, all of MN (US)

(73) Assignee: Primera Technology, Inc., Plymouth, MN (US)

( * ) Notice: Subject to any disclaimer, the term of this patent is extended or adjusted under 35 U.S.C. 154(b) by 0 days.

(21) Appl. No.: 09/372,826

(22) Filed: Aug. 12, 1999

Related U.S. Application Data
(60) Provisional application No. 60/130,872, filed on Apr. 23, 1999.

(51) Int. Cl.[7] .................................. G06K 7/10
(52) U.S. Cl. ................ 235/462.04; 235/469; 235/491; 283/81
(58) Field of Search .............. 235/462.04, 462.17, 235/462.25, 469, 454, 455, 491, 494; 283/81, 88, 92, 114

(56) References Cited

U.S. PATENT DOCUMENTS

| | | | |
|---|---|---|---|
| 3,671,722 A | * 6/1972 | Christie | 235/462.04 |
| 3,684,868 A | 8/1972 | Christie et al. | 235/61.11 |
| 3,812,325 A | 5/1974 | Schmidt | 235/61.11 |
| 4,157,784 A | * 6/1979 | Grottrup et al. | 235/488 |
| 4,283,623 A | 8/1981 | von Stein et al. | 235/465 |
| 4,443,694 A | 4/1984 | Sanford | 235/465 |
| 4,603,976 A | 8/1986 | Fetzer et al. | 356/402 |
| 4,604,065 A | 8/1986 | Frazer et al. | 434/331 |
| 4,605,846 A | 8/1986 | Duret et al. | 235/468 |
| 4,627,819 A | 12/1986 | Burrows | 434/337 |
| 4,729,128 A | 3/1988 | Grimes et al. | 382/58 |
| 4,795,894 A | 1/1989 | Sugimoto et al. | 235/468 |
| 4,818,847 A | 4/1989 | Hara et al. | 235/455 |
| 4,869,532 A | * 9/1989 | Abe et al. | 283/88 |
| 4,889,365 A | 12/1989 | Chouinard | 283/70 |
| 4,891,504 A | 1/1990 | Gupta | 235/462 |
| RE33,260 E | 7/1990 | Stephenson | 347/76 |
| 5,035,325 A | 7/1991 | Kitsuki | 206/459 |
| 5,083,814 A | 1/1992 | Guinta et al. | 283/70 |
| 5,129,974 A | 7/1992 | Aurenius | 156/64 |
| 5,132,729 A | 7/1992 | Matsushita et al. | 355/203 |

(List continued on next page.)

FOREIGN PATENT DOCUMENTS

| | | | |
|---|---|---|---|
| DE | 44 09 198 A1 | 9/1995 | |
| EP | 0 342 772 A | 11/1989 | |
| WO | 9013094 | * 4/1990 | G06K/7/10 |

*Primary Examiner*—Michael G. Lee
*Assistant Examiner*—Daniel St.Cyr
(74) *Attorney, Agent, or Firm*—Westman, Champlin & Kelly, P.A.

(57) ABSTRACT

A label for a component is provided with a continuous color tone background at least in segments of the label that can be detected as to a configuration using selected colored light sources which reflect from the different color tones of the label. A sensor can be used for discriminating between the reflection patterns from the light sources. A continuous color tone on the label changing smoothly from one color to others is applied to make a uniform shading from one color at one end of the label to another color at a second end, with various colors between the two ends. As an added feature, a number of black appearing strips forming a bar code can be provided on the label, with some of the strips reflecting infrared light and others not reflecting infrared light, so an infrared detector can be utilized for determining the pattern of the bar code for further identification of the labeled component. The bar code pattern will not be identifiable with the naked eye.

14 Claims, 5 Drawing Sheets

U.S. PATENT DOCUMENTS

| | | | |
|---|---|---|---|
| 5,135,569 A | 8/1992 | Mathias | 106/22 |
| 5,231,276 A | 7/1993 | Yoshihara | 235/454 |
| 5,270,526 A | 12/1993 | Yoshihara | 235/487 |
| 5,366,252 A | 11/1994 | Nishida et al. | 283/94 |
| 5,401,960 A | 3/1995 | Fisun et al. | 250/271 |
| 5,444,263 A | 8/1995 | Mastnak | 250/504 |
| 5,502,304 A | 3/1996 | Berson et al. | 250/271 |
| 5,514,860 A | 5/1996 | Berson | 235/468 |
| 5,516,590 A | 5/1996 | Olmstead et al. | 428/484 |
| 5,548,106 A | 8/1996 | Liang et al. | 235/454 |
| 5,576,528 A | 11/1996 | Chew et al. | 235/469 |
| 5,619,026 A | 4/1997 | Chou et al. | 235/462 |
| 5,719,948 A | 2/1998 | Liang | 382/112 |
| 5,771,315 A | 6/1998 | Matsuyama | 382/191 |
| 5,803,627 A | 9/1998 | Paranjpe | 400/240 |
| 5,853,255 A | 12/1998 | Soshi et al. | 400/237 |
| 5,861,618 A | 1/1999 | Berson | 235/468 |
| 5,867,586 A | 2/1999 | Liang | 382/112 |
| 5,929,422 A * | 6/1999 | Lappe | 235/462.13 |
| 6,119,943 A * | 9/2000 | Christy | 235/468 |

\* cited by examiner

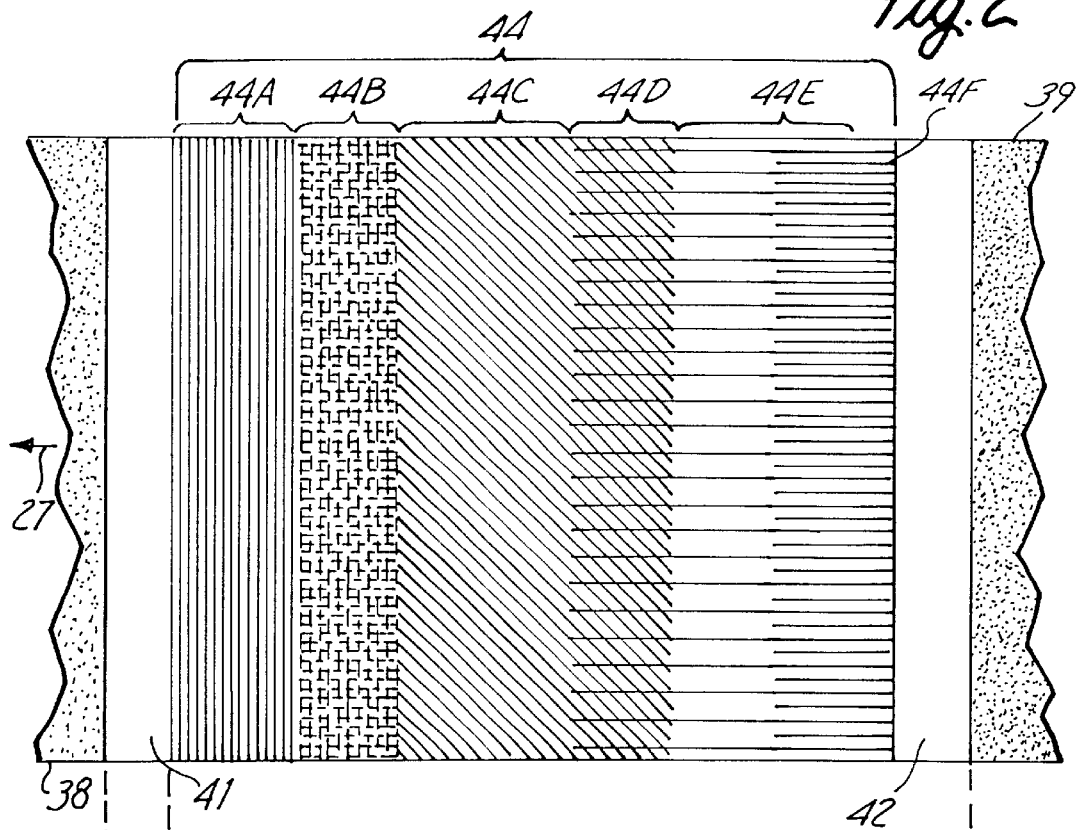
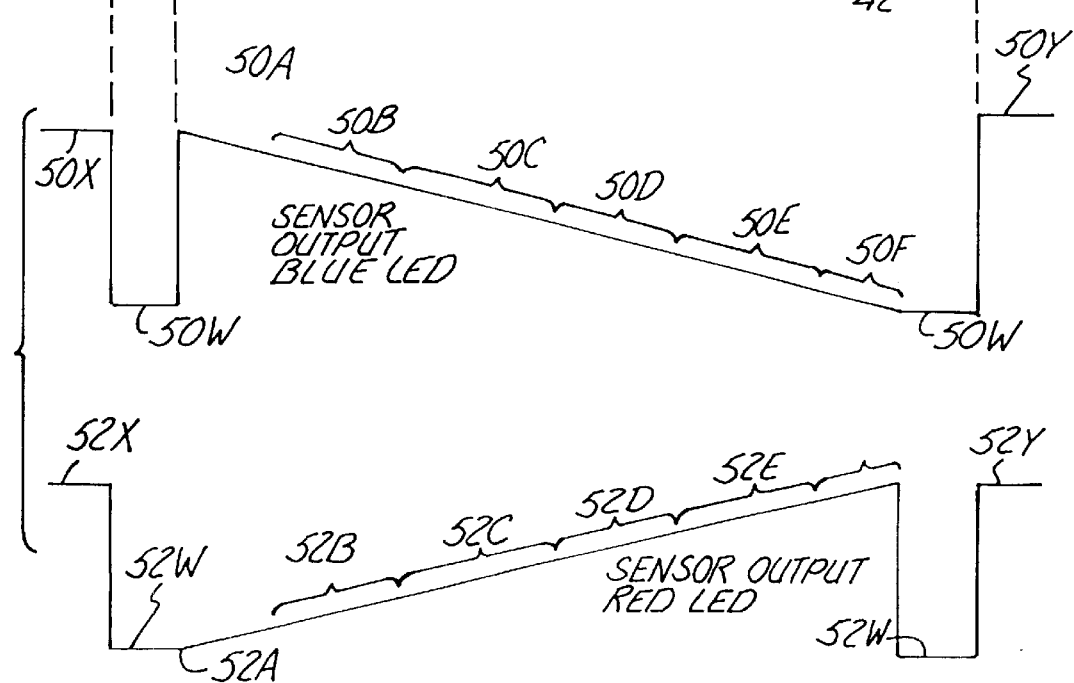

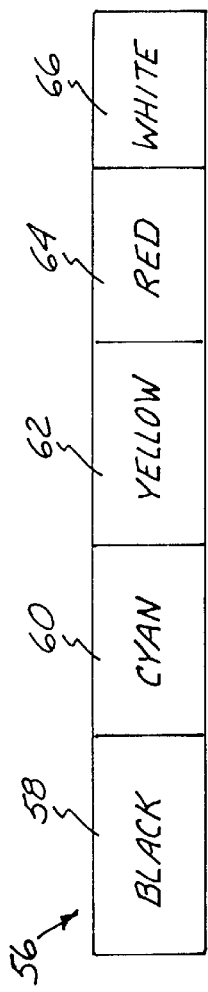
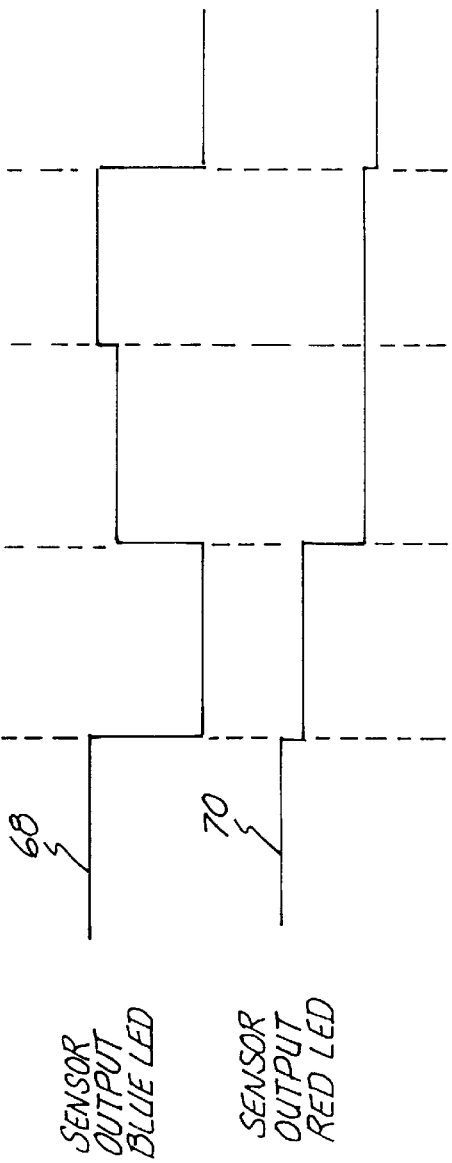

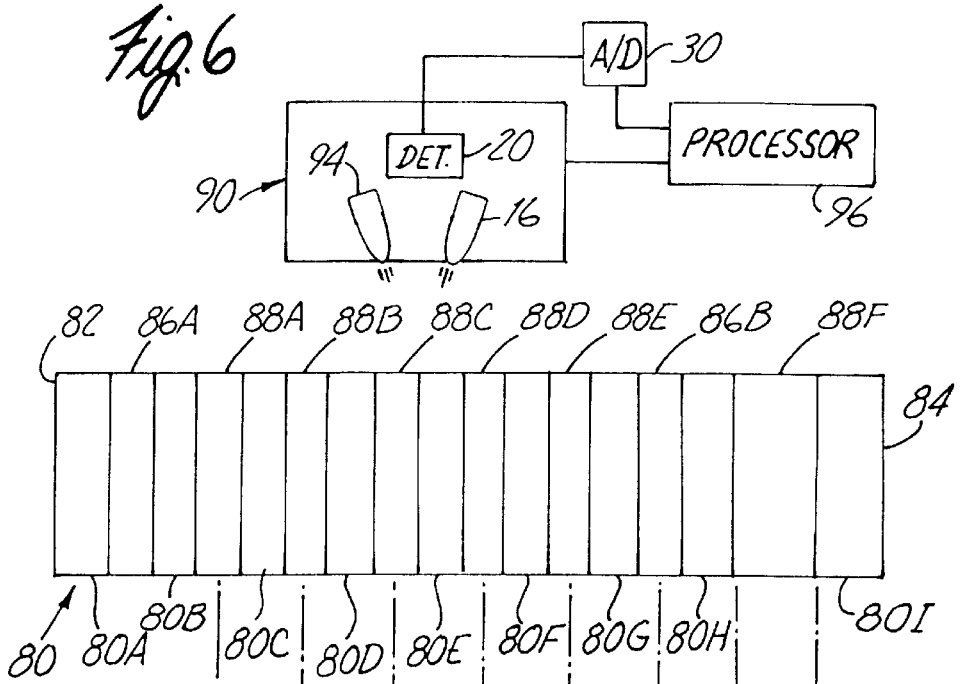
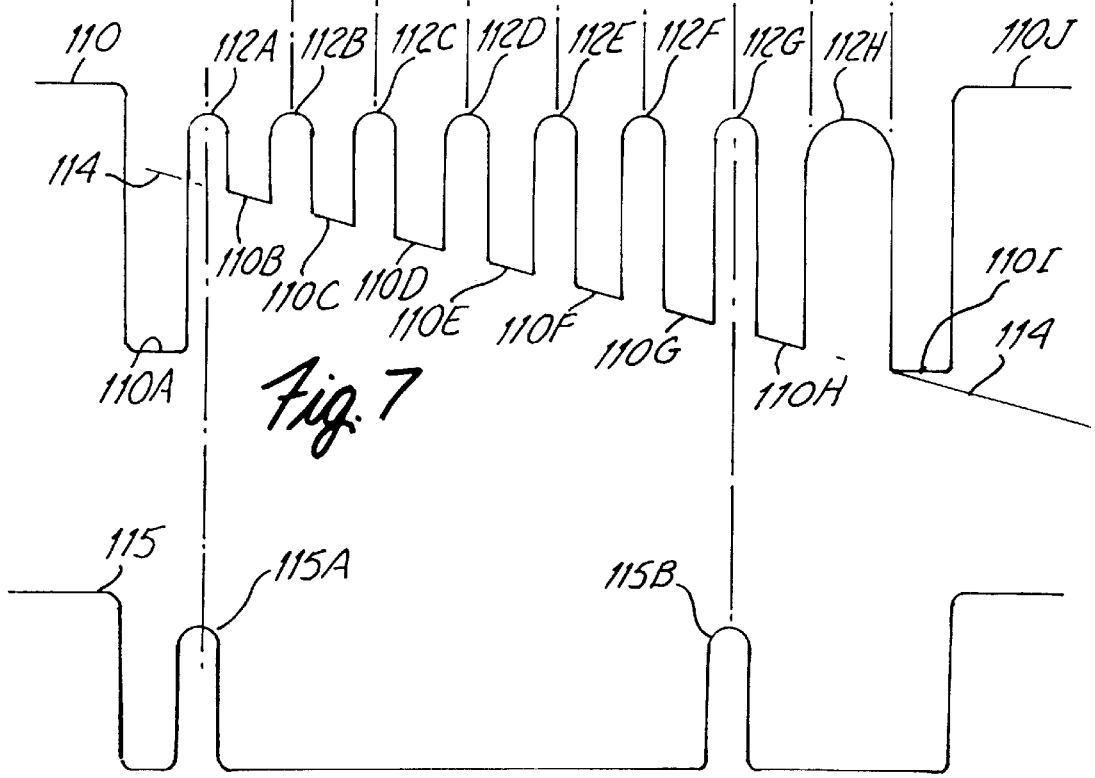

CONTINUOUS COLOR TONE INFRARED DETECTED BARCODES

CROSS REFERENCE TO RELATED APPLICATION

This application claims priority to provisional application Serial No. 60/130,872, filed Apr. 23, 1999, and entitled "CONTINUOUS COLOR TONE AUTO SENSING OF OBJECTS".

BACKGROUND OF THE INVENTION

The present invention relates to a continuous color tone background for sensing indicia to identify an object, and which does not use distinct color bars, but rather blends the tones together from one end of a label to another. Additionally, the continuous color tone background may be used with overlaid bars that appear black to a viewer, but made so some of which are infrared sensitive and some of which are not, so that an infrared detector can be utilized for reading the black bar code without the code being identifiable in the visible spectrum.

The use of bar codes that utilize colors for the printed codes which illuminate the code with two different colored lights for detection are known. These include distinct colored bars positioned side by side, and either spaced or contiguous. The sensors used respond to reflected light from the color code.

Additionally, infrared sensitive bar codes have been used in the past where the bar code marks are visible when illuminated in the light of a frequency outside the visible spectrum, specifically infrared light.

SUMMARY OF THE INVENTION

The invention utilizes the reflective properties of different colors to detect the presence of objects and identify labels with bars of unique colors and color intensities. One application is for devices, such as printers, that use different types of consumables such as the ink supplies or the printer ribbons. Without the invention there is the potential that the user will install the wrong consumable for the particular job to be done. The present invention provides a method and apparatus to verify the properties of consumables before functioning to detect the presence of the wrong consumable and warn the user before a mistake is made.

An example is an ink jet printer that accepts either a color or monochrome ink cartridge. When a print command file is sent from a controlling computer to the printer, the user must be sure the right type of ink cartridge is in the printer, based upon whether a color or monochrome image is to be printed. The bar code of the present invention is used to detect and identify the ink cartridge prior to printing, and if the wrong cartridge type is detected a warning is provided to the user.

Another example is a printer that accepts many different print ribbon types such as thermal transfer or dye sublimation printers. The present invention will permit an operator to make sure the proper ribbon has been installed and that the ribbon is installed properly.

Other consumable examples includes toner for printers and photocopiers, replaceable printheads, and all types of substrates onto which an image is printed. The present invention can be used to identify and control the proper replacement of any part that can be labeled. The present invention can also be used to control a process by using a multiplicity of labels and detectors to signal the presence and positioning of required objects, in the correct sequence, if so desired.

The variations in color intensity and hue (together called color tone) provide variations in analog signals from a detector by using a light or lights that reflect differently on the colors selected, as will be explained.

Although a rectangular label is shown, the varying color tones may be circular wherein on any radial line, the color tones would vary as now shown in the drawings with variations along a longitudinal line. The tone pattern also could be annular so that one color tone would be present and the tone would vary as a path was generated around the center, like the sweep of a compass needle.

The simple design and shape shown is for illustration. By providing various color variations in both color hue and color intensity, many different signal shapes can be achieved for coding.

The present invention further comprises utilizing a continuous color tone background label, which is then overlaid or intermixed with black bar code marks or black stripes, or with black printed letters or graphics and which are coded for infrared detection as to some of the strips or printed material with some bars or materials being nondetectable with infrared light. In order to accomplish this, infrared absorbing black is used on some of the black bar code marks or strips to absorb infrared radiation or light, but others of the marks or strips are of a visually black mark that reflects infrared. Certain process color black reflects infrared light, rather than absorbing it. Although this process color black looks black to the naked eye, it is made using cyan, yellow and magenta primary colors which are commonly used in a color printer ribbon and which can create black printed images on the printed substrate.

An analog signal is generated from the continuous tone color with the sensors used. The analog signal contains abrupt signals caused by detection of the black strips.

The continuous color tone label would still permit identification using that continuous color tone concept, even with the infrared sensitive and non-infrared sensitive black bars or marks overlaid over the continuous color tone.

BRIEF DESCRIPTION OF THE DRAWINGS

FIG. 2 is an enlarged plan view of a typical continuous color tone label made according to the present invention;

FIG. 3 is a diagrammatic representation of sensor outputs from blue and red LEDs coordinated with the continuous color tone label of FIG. 2;

FIG. 4 is an illustrative representation of a print ribbon having adjacent different color segments, using a sensor for providing outputs based on light reflected from blue and red LEDs;

FIG. 5 is an illustrative representation of outputs from blue and red LEDs coordinated with the colors shown in FIG. 4; and FIG. 6 is a representation of a continuous color tone background label interspersed with bar code bars or strips that are black to the naked eye, and some of which are responsive to infrared light and others of which are not;

FIG. 7 is a diagram of a signal plot provided by an optical sensor providing an output based on the continuous color tone of the label of FIG. 6;

FIG. 8 is a diagram of a signal plot from an infrared detector of FIG. 6;

DETAILED DESCRIPTION OF THE ILLUSTRATIVE EMBODIMENTS

Figure 1:
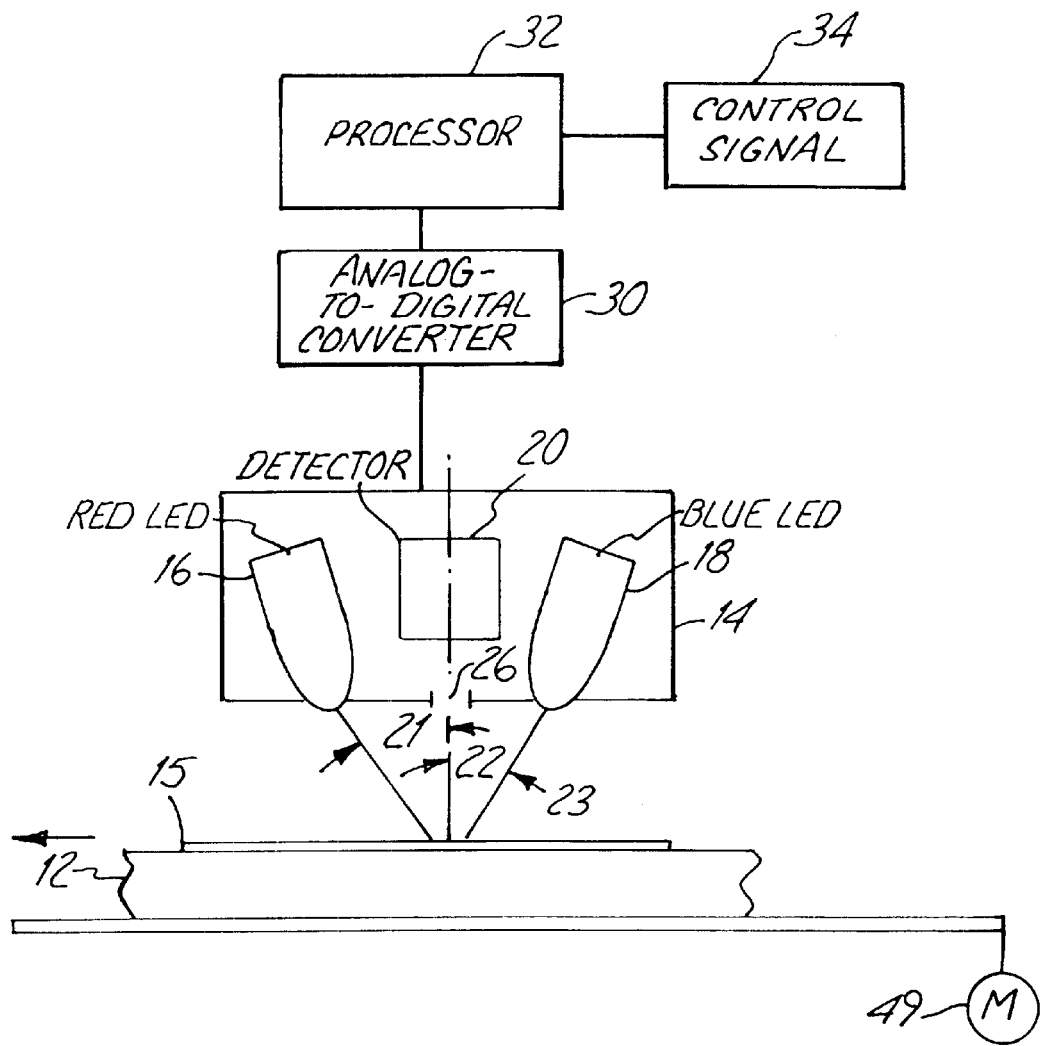
FIG. 1 is a schematic representation of a detector used for identifying appropriate strips in a continuous color tone coded label.

A typical embodiment of the invention as shown in FIG. 1 consists of a sensing component or assembly 10 that is positioned to sense passage of a labeled component 12. The sensing component 10 utilizes one or more sources of light, that shines onto a continuous color label 15 on the labeled component 12 as the labeled component 12 moves relative to the sensing component or assembly 10. The sensing component or assembly includes a housing 14 that mounts two sources of different colored light such as LEDs of different colors. In this example a red LED 16 and a blue LED 18 are mounted on either side of a light sensor (a photo sensitive diode) 20. The LEDs 16 and 18 are mounted at an angle relative to a line 22 perpendicular to the plane of the label 15 on labeled component 12. The angles 21 and 23 of the LEDs are equal on opposite sides of the line or plane 22 so the two light beams from the LEDs are focused onto the desired position of the labeled component 12. The focus area can be narrow in fore and aft direction, that is the direction of relative travel, as shown at 27 in FIG. 2, but the light can be in a band across a portion of the width of the label.

Color perception for humans, as well as detectors sensing (seeing) color, is based on light as it passes through or is reflected from objects around us. Light waves have a range of wavelengths. In the visible light range, red has the longest wavelength and blue the shortest. The human eye has an array of cones that are sensitive to red, green and blue light waves. An object appears green if it reflects the green light back to the eye while absorbing all other wavelengths.

Sensors, such as sensor or detector 20, expand the range of light wavelengths that can be detected. For example, infrared sensors will detect light waves that are longer than the human eye can detect. Ultraviolet light has a shorter wavelength than the eye can detect, but can be detected with electronic sensors.

The cyan, magenta and yellow (CMY) print method used in color printers, such as the printer sold under the trademark IMPRESSA by Primera Technology, Inc., of Plymouth, Minn., combines cyan, magenta and yellow ink ("primary colors") in varying intensities to produce a wide range of colors as perceived by an eye. The eye and sensors, such as light sensitive diodes (photo diodes), perceive CMY colors based on the wavelength of the light reflected from the printed area. CMY is called a subtractive print method because adding colored ink subtracts wavelengths reflected to the eye (or conversely increases the absorption of light waves) so the eye and the sensor perceives or detects a darker color.

Dithering is the technique used to combine small dots of the primary colors to create the perception of other colors. The dots of the primary colors are too small to be perceived or sensed individually by the eye, or by most sensors. Thus different combinations of dots of the primary colors reflect light waves differently and create the perception of different colors rather than the perception of numerous dots of three different colors arranged on the printed object.

The dots are typically all printed in a line by either spraying droplets of ink (ink jet printing) or heating tiny resistors on a print head to transfer dots of ink from a ribbon placed between the print head and the print media (thermal transfer printing). Interlacing is the technique of overlapping the lines of tiny ink dots to reduce the effect of any slight misregistrations that may result in noticeable print bands. The perception of a continuously changing color tone can be created by only slightly changing the combination of dots of primary colors in each print line as lines are printed from one end of the image to the next. The ink jet printing is capable of printing about 600 dots per inch along the print head or print lines, and will print about 600 lines per inch in direction of movement perpendicular to the print lines. Thermal transfer and dye sublimation printers usually print 300 dots per inch of print line and 300 dots per inch of travel.

Although the length of the light waves reflected from each print line changes, it is imperceptible from one line to the next thereby creating the perception that the color tone changes continuously without clear lines of delineation between intensities of a color or between blends or hues of colors.

When the labeled component 12, which supports the flat label 15 is in position under the sensing component 10, the combined light from the LEDs 16 and 18, strikes the label and reflect different amounts of light, depending on the color in the focus area. Any reflected light is received by the receiver 20 in the sensing component 10, where it enters through an aperture 26 in the housing 14. The signal generated by the light detector 20 is analog, and is converted to a digital signal in an A to D converter 30, after which it is received by a processor 32 and compared to a digitally stored reference value to determine if the image sensed is the same as the reference. The stored reference images are digital representations of the light sensor 20 outputs based on reflected light from the known color LEDs reflected off of known color tones on the label 15 of labeled component 12. The memory of the processor stores the information from a calibration run or from preprogrammed values. Several passes of the label past the sensor can be made and the processor 32 will verify the signals as being genuine by comparing the received signals to make sure they repeat thus checking signal validity. Also, the processor 32 can then send a control signal 34 to control a device or send a message to the user based upon whether the correct labeled component was detected.

Figure 9:
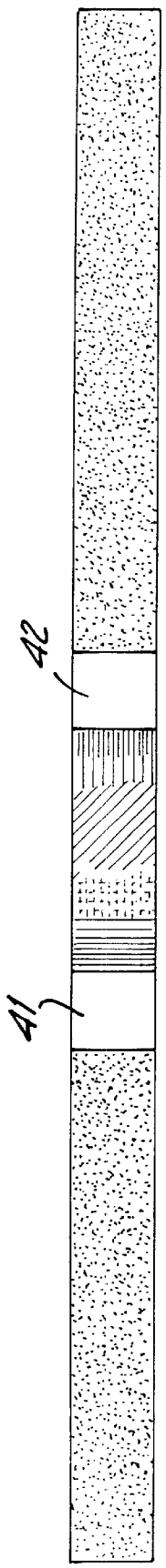
FIG. 9 is an actual color example of the label of FIG. 2.
Figure 10:
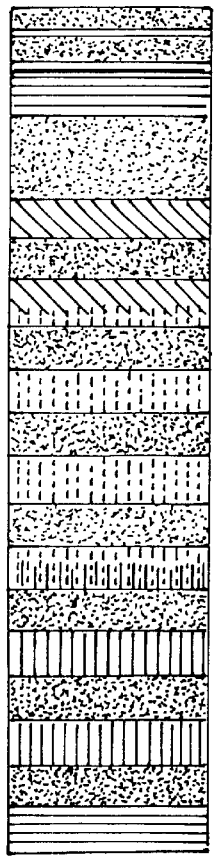
FIG. 10 is an actual color example of the label of FIG. 6.

The label 15 shown in FIGS. 2 and 9, consists of a series of print lines blended to give different color tones or different color intensities printed on the label or substrate to be applied to a part. The colors also could be printed directly onto a part or component. FIG. 2 is an example of a continuous tone label in which the different color intensities and hues blend into one another from one end to the other. The label has a non-responsive portion, represented by a black band 38 at the leading end, and a non-responsive region represented by a black band 39 at the trailing end. The sensor 20 receives no meaningful reflection from either the red or the blue LED in this non-responsive region, which is represented by the outputs 50X and 50Y, 52X and 52Y in FIG. 3, when over the black bands. The label 15 commences in this form with a first white band (total reflection) 41 which defines the start of the continuous color tone segment 44. White reflects both red and blue and the sensor provides a maximum reflectivity output signal as shown at 50W and 52W in FIG. 3. The continuous color tone panel 44 starts with a bright red leading end portion 44A, which causes the red LED to provide a high reflectivity output, close to the level for the white band as seen at 52A in FIG. 3.

The example in FIG. 2 shows a linear shift in color from red at leading edge 44A to cyan at the trailing edge 44F.

Before moving from edge 44A to edge 44F, the eye perceives a seamless continuous change of color as more white and yellow appears in the red, as at 44B, then evolving through a green at 44C to a blue green hue at 44D that becomes closer to cyan, with less intensity at 44E towards edge 44F where the tone has transformed to a true cyan. The label ends with a white strip 42 which joins the non-responsive region represented by band 39. The white is provided by not printing on a white background of the substrate of backing of label 15.

What the eye does not perceive is that the red color at edge 44A is created with a combination of tiny dots of yellow and tiny dots of magenta ink. Moving from band 44A to the end 44F, the number of printed dots of yellow and magenta in a line are reduced and the red is replaced with dots of cyan, which combined with yellow, produces a green. The printing also can be made less dense so white will show through. This reduces the intensity of the color, which also is detectable with sensor 20. At end 44F, there are no dots of any ink or color other than cyan, so there is a true cyan color. Although each vertical line of ink dots, shown in color code in FIG. 2 or thermal transfer ribbon dots, between edge 44A and edge 44F is distinctly different due to the different combinations of colored dots, the eye perceives a seamless and continuous change of color tone as the eye moves from edge 44A to edge 44F. The actual label is shown in FIG. 9.

The continuous color tone does not have to be a linear shift in color. An example of other shifts include a square shift, conical (circular) and pyramidal shifts. It also must be remembered that any analog signal shape can be made by varying the colors and intensities in different ways. A single ramp-type signal shape has been used in this example.

The sensor 20 output signal shown in FIG. 3 from the light reflected from a given set of colors on a label 20 is unique because different color tones reflect and absorb light differently. Thus different sensor outputs will be generated using different combinations of colored lights and different hues and intensity of colors. The different colored light (red and blue) from the different colored LEDs 16 and 18 generate different sensor outputs, as shown in FIG. 3, when reflected off the same label 15 of labeled component 12.

By illuminating one LED at a time and scanning the color-coded label 15 of labeled component 12 across the sensor 20 each time (several passes are made), the sensor 20 detects two different conditions and provides two different output signals that are unique.

The labeled component 12 is mounted on a carrier 48 which can be driven by a reversible motor 49, controlled from processor 32 under a desired control program. It can be moved back and forth as desired. The sensing component also can be moved instead of the labeled component.

In this example, the blue light from LED 18 will not reflect from the red edge portion 44A so the signal from detector 20 shows minimum reflectance at 50A. The sensed reflectivity of the blue LED increases at regions 44B and 44C with increasing reflectivity signals shown at 50B and 50C, where the analog signal is ramping linearly. The regions where the blue light reflects well are at areas of the label which are changing to cyan, represented at 44D, 44E and 44F. Since reflectance is increasing, increasing signals for the regions shown at 50D, 50E and 50F are provided. The maximum reflectance signal is at 50F where the label is cyan. The term maximum is used to denote a relative value, wherein actual signal voltages may be decreasing from a reference level.

The red light LED, alternately, will reflect well off area 44A that is red and give a maximum reflectance signal at 50A, but will be partially absorbed by areas on the label toward cyan at 44E and 44F where a minimum red reflectance signal is given. The light that is reflected changes as it moves across the different color hues and intensities on the labeled component 12 so the outputs are ramp signals corresponding to the color tone changes, as shown at 52B, 52C, 52D, 52E and 52F.

When the detector overlies the second white strip 42, where both LEDs reflect to provide signals 50W and 52W, it is the end of sensing. The non responsive region 39, where the light from both LEDs is absorbed, is shown at 50X, 50Y and 52X, 52Y. The sensor 20 converts this changing signal from each LED into a shape that is unique to the specific blending of color tones on the label 15 of labeled component 12. The combination of color changes are unlimited with sensors that are capable of discriminating minor changes.

FIG. 3 illustrates the output from the sensor 20 for the continuous tone label 15 in FIG. 2, as discussed above. When the labeled component is illuminated with the blue LED, the one signal shape is detected, and a completely different, unique shape is provided when the same labeled component is illuminated with the red LED. The dotted lines between FIGS. 2 and 3 represent the location of abrupt change in signals. These are to mark the start and stop end of the label that contains the coded information.

By sensing the continuous color tones, the device can utilize analog signals and provide a proper "shape" of the signal. If the shape varies too much from the expected shape then an improper code is detected and command may given, such as to halt the operation. The color intensities and hues can be varied to give any complex shape desired. By printing different color patterns on the continuous color tone label, one is able to create unique codes.

Continuous color tones are obtained by utilizing a suitable program for controlling color printers. Such a program permits one to select various colors for printing. The shape printed can be rectangular, round, or other peripheral shaped labels, as well as letters and graphics that can be color toned or filled in printing such as letters, graphic representations and the like. One such software program usable on personal computers is sold under the mark CORELDRAW®, made by Corel Corporation, 1600 Carling Avenue, Ottawa Ontario, Canada. Version 8.0 of the software has been found to be satisfactory, and will permit an operator to select from color representations, various gradations or tones of color, both as to hue and intensity. The computer used for the CORELDRAW® software can be a color printer control computer.

The printing is carried out by thermal transfer, dye sublimation, or ink jet printers that are capable of color reproduction, and these printers use the three primary colors of magenta, yellow and cyan, and then combine these colors to make additional colors such as blue, red and green. The label can have a white surface, for controlling the intensity of the color, by changing (increasing) the spacing of the printed dots, and the hue is varied by mixing in different proportions of the primary colors across a layer where there is no distinct division between the different colors. Additionally, the white background can be printed in place utilizing a ribbon or ink that provides white printing.

The continuous tone can be selected utilizing the above computer program and once selected, the particular shape of the label also can be selected on the CORELDRAW® Program. This is then used to control the color printer as desired.

Normally, dye sublimation and thermal transfer printers will provide about 300 dots per inch of line, and about 300 lines per inch of travel, along the longitudinal axis of the label. Ink jet printers are variable, but can have up to 600 dots per inch of print line and 600 lines per inch of travel. When using ink jet printers and thermal transfer printers, if the intensity of the color is to be varied, a selected number of the dots are not printed, so that the white background will show through and make the red, for example, less intense. In the case of a dye sublimation printer, the intensity can be varied by controlling the transfer of the ribbon material to the substrate such as a label, by varying the temperature of the individual resistors that are used in such a printhead.

It should be noted that the black blocks that are shown in FIG. 2 represent the ends of the label where there would either be no label or would represent the object that is being identified. It is not normal to print black blocks at the ends of the label, but it is desirable to have some identifiable segment such as the white lines 41 and 42 shown, or as will be shown subsequently, some other particularly recognizable color strip that can be identified by an LED that is being used.

FIG. 4 is illustrative of a color segmented sheet 56 where distinct divisions between colors are used, as opposed to the continuous changing tone of the present invention.

FIG. 5 illustrates the output from the sensor for the sheet 56, which has separate distinct sections of different colors, including black 58, cyan 60, yellow 62, red 64, and white 66. The FIG. 5 output for the blue LED is illustrated by the line 68, and it can be seen that it has an output that corresponds to the cyan block 60 where it reflects well, with substantially no outputs from the red and yellow blocks 62 and 64, and an output from white. There is no output from the black segment 58.

The sensor output from the red LED provides a signal indicated by the line 70, with no output at the black or cyan blocks 58 and 60, but having a maximum output at the yellow, red and white blocks, 62, 64, and 66. The sensor outputs shown at 68 and 70 are illustrative of outputs which would be obtained for the same colors at the point at which they might appear in a continuous tone label. For the continuous tone, an analog signal would increase or decrease smoothly as the label moved past the sensor, without the abrupt changes in the signal of FIG. 5.

Referring now to FIGS. 6, 7 and 8, a label 80 is illustrated, and it includes continuous a color tone label extending from a leading end 82 to a trailing end 84. Along the length of the label 80, there are also a plurality of bars 86 forming a bar code, and other bars 88 that appear to the human eye as identical to bars 86 indicated at 88. All of the bars 86 and 88 are black to the naked eye. The bars 86 are made up of a monochrome black which absorbs infrared light, while the bars 88 are formed as a process color black which reflects infrared light. Infrared detectors thus can discriminate between the bars 86 and 88.

The process color black is an overlay of cyan, yellow and magenta, which appears black. As shown in FIG. 6, a sensing component 90 has an infrared light source 94 that is positioned above the label 80, as well as a detector 20. The detector 20 is selected to sense both visible and infrared light. As the sensor and label move relative to each other (either the sensing component or the label can be moved) the reflected infrared radiation from the bars 88 will be recorded by the infrared sensor and read in the normal manner for a bar code, while the bars 86 will not reflect the radiation.

As stated, in this label 80, a different continuous color tone arrangement is utilized under the bars 86 or 88. The label 80, in this form of the invention, includes a strip of bright red indicated at 80A, which, as shown in FIG. 7, provides a sharp signal change to a signal level indicated at 110A, along the signal line 110. Since the red LED does not reflect from the first black line 86A, the signal will change, indicating that there is little or no reflection, and will go to a level indicated at 112A. The next continuous color tone strip or bar that is exposed to the sensors shown at 90, and which is not blocked out by the first black strip 86A is shown at 80B, and in a typical example, it is a cyan color, which does not reflect much red light from a red LED, and provides a signal shown at 110B that is at different level from the signal for the black strips. The signal 110B can have a slope because the continuous color tone changes in tone between the trailing edge of the first black strip 86A and the leading edge of the next black strip which is shown at 88A in FIG. 6.

Again, the continuous color tone will be printed across the entire length of the label 80, but the black strips 86 and 88 will interrupt the color with signal peaks from the sensor for visible red light such as sensor 20. The next signal from black bar 88A is shown at 112B. Then, the color tone of the label is getting less intense cyan, as shown at 80C, and this results in an declining analog signal level shown at 110C. The next black strip 88B provides a signal 112C. Since the black strips do not reflect red light, there is a following continuous color tone segment, shown at 80D, that is visible to the LED and sensor. This segment 80D is modulating to be more light blue, less intense, by having fewer cyan dots in the lines of printing so the white shows through, and it results in a signal shown at 110D which again, can have a sloped bottom level indicating a change in color tone from the leading edge of the section 80D to the trailing edge of the section 80D. The bar 88C provides a signal 112D. The section 80E is modulating in color to become more gray, resulting in a further changing analog signal 110E, that is separated from the analog signal 110D by the signal 112D which represents bar 88C.

The next color tone segment 80F following bar 88D, which provides signal 112E, is changing in hue more toward a full gray, with some red or yellow interspersed to provide for an increased reflection from a red LED, this provides a different level signal 110F shown in FIG. 7 Then, a change is again being made more toward red at continuous color tone segment 80G which is more reflective and provides for the signal 110G. A continuous color tone segment 80H is becoming more red and providing for greater reflection of the red LED to provide a signal 110H. A black infrared reflecting bar 88F is provided, with extra width for identification, and the continuous color tone, which again has been shifting to red toward the trailing end of the label, has a bar 80I that is solid, intense red and provides a signal shown at 110I that is at a same level as the signal 110A, indicating the end of the label being sensed. The sensor output passes the end of the label and goes back to its static (non response) level shown at 110J.

FIG. 8 is a representation of the signal from the detector 20 when the label is illuminated by he infrared LED 94. This signal is delivered to processor 96. The signal represented at 115 is the background level signal. The presence of label 80 causes a change that continues until a signal 115A is received from the sensor 20 indicating absorbed radiation from bar 86A. The signal returns to its reflective state until the bar 86B passes underneath, when the signal 115B is provided. The two digital signals 115A and 115B are read by processor 96 and used as an identification code for the product carrying the label.

Again, it has to be emphasized that the continuous color tone under the infrared reflective bars 88 and infrared absorbing bars 86 is a continuous tone that has label end markings of red bars. The color tone modulates from a cyan color in the region 80B to a red color in the region 80H, providing a sloped analog signal line shown at 114, while the individual black bars remain at substantially the same level signal from the red LED, that interrupts the sloped signal.

It is apparent that a continuous color tone label that is responsive in a desired manner to a blue LED, or other light sources can be used just as the label shown at FIGS. 6 and 7, is responsive to a red LED.

Two visible spectrum response LEDs from FIG. 2 could be used with the label 80, shown in FIGS. 6 and 7 as well, and the blue LED would be providing substantially a reverse incline to the slope of the linear signal plot shown at 114.

The analog signal segments received by the sensor 20 is converted to a digital signal by an A-to-D converter and linearized to form a continuous signal. It is then sent to a processor 96 that compares the detected signal to a reference signal stored in memory. In this way, the identification of the object on which the label 80 is placed can be made.

It should be noted that several passes of the label and sensor can be made, and compared in the processor so that when two substantially identical signals are received, they can be detected as being true and used for identification. The number of passes for sensing can be varied as desired.

Additional verification of the label 80 can be thus made by the processor 96 by analyzing the output from detector 20 while illuminating the bars or marks 86 with the infrared LED 94. The continuous color tone between the ends 82 and 84 of the label as described is designed for use with a red LED 16 in housing 90, or in a separate housing. Optical detector 20 also can be mounted in housing 90 or in a separate housing.

Both the black bars or marks 86 and 88 cause changes in the analog signal when illuminating label 80 with the red LED, but the continuous color tone provided by detector 20 between the bars is read by the detector, as shown in FIG. 3. The color tone separated by black marks provides analog signal segments which, when plotted with a line smoothly joining adjacent signal segments provides a plot that corresponds to the plot of the continuous color tone reflective response along the entire label before adding the bars or marks 86 and 88. As shown, the signal segments form a straight line 114, which is preferred. The blended signal segments could form curves as well, but no steps. The plot of the segments is thus without abrupt changes in color tone, and the signals from the black marks or bars can be ignored in the analog output. The straight line plot 114 shows there are no abrupt color changes in the continuous color tone, since the straight line has a uniform slope, the plot corresponds to a plot stored of a signal having the same color tone on its entire surface, including the segments between marks.

It should be noted that the black marks 86 and 88 used for infrared detection can be letters or numerals or geometrical shapes other than the rectangular bars disclosed.

As can be seen in FIG. 5, neither one of the blue or red LED outputs are reflected from black lines, (whether monochrome black or process black) so the color tones can be determined using a red LED and/or a blue LED and the detector, as shown in FIG. 1. With the color tone background and black infrared responsive marks two different identification processes can be used with the same label.

The use of visible black strips, some of which are invisible to infrared, helps avoid counterfeiting of labels. The continuous color tone makes it very difficult to photocopy or reproduce the exact color hues and intensities of a labeled component. This also helps in preventing counterfeiting.

The sensitivity of the process can be adjusted to allow for different manufacturing tolerances by adjusting how closely the sensed image must match the reference image.

The present invention does not contain materials such as magnets that require special handling for manufacturing or for recycling.

The present invention is a superior solution when component size is a limitation in either the device or component in which the invention is used, or in the manufacturing process.

Figure 11:
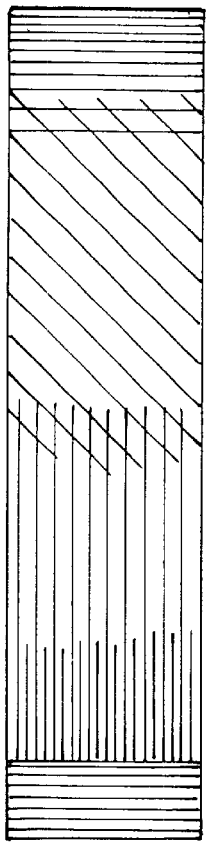
FIG. 11 is an actual color example of the printed label of FIG. 6 showing the continuous color tone without the black bars attached.

FIG. 11 illustrates label 80 without the black marks 86, 88 to show the continuous color tones. The analog signal response from a red LED and detector 20 would be a signal line identical to line 114 in FIG. 7. The label shown in FIG. 11 can be used for coding as it is and black marks for additional detection can be added as desired.

Although the present invention has been described with reference to preferred embodiments, workers skilled in the art will recognize that changes may be made in form and detail without departing from the spirit and scope of the invention.

What is claimed is:

1. A sensing apparatus for detecting a code comprising a readable component having a changing color tone on the component surface blended to modulate shades of color along a path of travel, a sensing component adjacent the readable component and including a light source for directing light onto said readable component, a detector to detect reflected light from the blended colors of said readable component and provide output signals as a function of received reflected light, and a processor for processing the output signals from the detector for determining the code provided on the readable component, wherein the detector provides an analog signal indicating levels of color tone on the surface and wherein the changing color tone changes in intensity and hue of primary colors such that at any two locations along a length of the code the detector output signal is different and there are no abrupt changes in intensity and hue of the primary colors between the two locations.

2. The apparatus of claim 1 and at least one bar that visually appears black to human eyes provided on said surface of said readable component between first and second ends, the modulated shades of color being exposed on opposite sides of black bars.

3. The apparatus of claim 2 wherein there are a plurality of bars which appear black, and wherein selected ones of the black bars reflect infrared radiation and others of the black bars absorb infrared radiation.

4. The apparatus of claim 2 wherein there are a plurality of bars which appear black and wherein selected ones of said bars are monochrome black, and others of said bars are process color black.

5. The apparatus of claim 1 wherein the readable component comprises a label, and wherein there are two light sources in said sensing component, said light sources comprising different colored lights selected to provide selective reflection from the color tone on the label.

6. The apparatus of claim 5 wherein said lights comprise a blue light, and a red light, energized for determining the code from the colors of the label.

7. The apparatus of claim 1 and an analog to digital converter to receive the analog signal and provide a digital signal to the processor representative of the analog signal received by the sensing.

8. The apparatus of claim 1 wherein there are two light sources comprising a blue light emitting diode and a red light emitting diode.

9. A sensing apparatus for detecting a code comprising a readable label component having a changing color tone on the component surface blended to modulate shades of color along a path of travel, a sensing component adjacent the readable component and including a light source for directing light onto said label component, a detector to detect reflected light from the blended colors of said label component and to provide output signals as a function of the reflected light, a processor for processing the output signals from the detector for determining the code provided on the label component wherein the detector provides an analog signal indicating levels of color tone on the surface, and wherein the readable component having a changeable color tone on the component surface has a plurality of visible light absorbing marks on the surface that include components spaced apart in direction of reading of the readable component, the color tone having a color tone pattern detected by the detector between the light absorbing marks and providing analog signal segments which, when plotted and joined with signals from adjacent sections, provides a plot of an analog output signal corresponding in shape to a signal from a component having a continuous color tone including the color tone pattern, and which is free of the marks.

10. The apparatus of claim 9 wherein the changing color tone has the primary colors of cyan, yellow and magenta selectively applied to form the modulated shades which vary in reflectivity from the first end of the label component to the second end of the label component.

11. The apparatus of claim 9 wherein the plot of the analog output signal is a straight line.

12. The apparatus of claim 11 and a detector for detecting the marks which do not reflect the infrared radiation.

13. The apparatus of claim 9 wherein the marks include first marks which reflect infrared radiation and second marks which absorb infrared radiation.

14. The method of detecting a colored label comprising applying a continuous changing color tone on portions of the label;

provising a colored visible light and shining the colored visible light on said label, and detecting reflected output from the colored visible light to determine a pattern of color tone on the label;

providing infrared reflective material and infrared absorbing material overlying portions of the continuous color tone; and sensing the infrared reflections from the infrared reflective material for determining a further representation of a code on the label wherein the infrared reflective material comprises first spaced marks that reflect infrared radiation and absorb visible light, and second marks that absorb both infrared radiation and visible light interspersed with the first marks, and wherein detecting reflected output comprises detecting the colored visible light reflected from between the marks to establish a signal based upon the color tone between adjacent spaced marks; and processing the detected reflected output and comparing the detected reflector output to stored references to determine a code from the label.

\* \* \* \* \*